United States Patent
Steer et al.

(10) Patent No.: US 7,970,439 B2
(45) Date of Patent: Jun. 28, 2011

(54) SYSTEMS AND METHODS FOR VISUAL ALERTING MECHANISMS ON A MOBILE COMMUNICATION DEVICE

(75) Inventors: Marc A Steer, San Diego, CA (US);
Kenneth W Baar, Escondido, CA (US);
Sidney Sitachitt, San Diego, CA (US);
Karoly Becze, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1144 days.

(21) Appl. No.: 11/070,709

(22) Filed: Mar. 1, 2005
(Under 37 CFR 1.47)

(65) Prior Publication Data
US 2006/0199618 A1    Sep. 7, 2006

(51) Int. Cl.
*H04B 1/38* (2006.01)
*H04M 3/00* (2006.01)
*G08B 5/22* (2006.01)

(52) U.S. Cl. ............... 455/567; 455/67.7; 455/412.2; 455/566

(58) Field of Classification Search ............. 455/567, 455/566, 569.1, 67.7, 418, 412.2, 413, 415, 455/466, 550.1, 556.1, 558–559, 575.1, 90.3, 455/90.31; 379/373.01, 373.02; 348/705; 345/87; 340/7.61, 7.62
See application file for complete search history.

(56) References Cited

U.S. PATENT DOCUMENTS

| | | | |
|---|---|---|---|
| 5,548,084 A * | 8/1996 | Tracy | 174/381 |
| 6,073,034 A | 6/2000 | Jacobsen et al. | |
| 6,463,278 B2 * | 10/2002 | Kraft et al. | 455/418 |
| 6,486,608 B1 | 11/2002 | Chong | |
| 7,027,844 B2 * | 4/2006 | Nuovo | 455/575.1 |
| 7,079,830 B2 * | 7/2006 | Critz et al. | 455/403 |
| 7,085,584 B2 * | 8/2006 | Shima | 455/550.1 |
| 7,136,482 B2 * | 11/2006 | Wille | 455/567 |
| 7,151,954 B2 * | 12/2006 | Nagata | 455/567 |
| 7,178,735 B2 * | 2/2007 | Chiang et al. | 235/472.01 |
| 7,319,861 B2 * | 1/2008 | Benco et al. | 455/414.1 |
| 7,333,839 B2 * | 2/2008 | Hutchison et al. | 455/575.1 |
| 7,352,930 B2 * | 4/2008 | Lowles | 385/31 |
| 7,383,062 B1 * | 6/2008 | On | 455/558 |
| 2002/0010008 A1 * | 1/2002 | Bork et al. | 455/567 |
| 2002/0118155 A1 * | 8/2002 | Fluhrer | 345/87 |
| 2003/0083110 A1 | 5/2003 | Lutche et al. | |
| 2003/0119460 A1 | 6/2003 | Zipper | |
| 2003/0151696 A1 * | 8/2003 | Moriya et al. | 348/705 |
| 2003/0166405 A1 | 9/2003 | Jauk et al. | |
| 2004/0097261 A1 * | 5/2004 | Ujii | 455/556.1 |
| 2004/0127263 A1 * | 7/2004 | Vegh | 455/567 |
| 2004/0158865 A1 | 8/2004 | Kubler et al. | |
| 2004/0179655 A1 | 9/2004 | Brandt | |
| 2005/0255828 A1 * | 11/2005 | Fisher | 455/406 |
| 2006/0105755 A1 * | 5/2006 | Brandt | 455/418 |
| 2007/0037605 A1 * | 2/2007 | Logan | 455/567 |
| 2008/0085741 A1 * | 4/2008 | Tauberman et al. | 455/567 |

* cited by examiner

*Primary Examiner* — Pablo N Tran

(57) ABSTRACT

A mobile communication device includes an alerting mechanism comprising a light source, wherein the light source is configured to alert the user via a visual alert that an event has, or is, occurring. The event can be an incoming communication, a voice message, an alarm etc. The visual alert can be synchronized with an audible alert also included in the mobile communication device.

7 Claims, 3 Drawing Sheets

SYSTEMS AND METHODS FOR VISUAL ALERTING MECHANISMS ON A MOBILE COMMUNICATION DEVICE

FIELD OF THE INVENTION

The field of the invention relates generally to mobile communication devices and more particularly to visual alerting mechanisms.

BACKGROUND OF THE INVENTION

Mobile communication devices, such as mobile telephone handsets, include alerting mechanisms to alert the user to certain events, such as an incoming communication or some type of alarm related to an application running on the device. Conventional alerting mechanisms include a ring tone, which is often customizable. In fact, portions of songs or other types of audio files can be used as ring tone replacements in many conventional devices. Many conventional devices also include a motor that can be configured to vibrate to indicate an alert, in order to provide a silent mode of operation.

Many mobile communication devices also include light sources, such as light emitting diodes (LEDs). LEDs can be used to backlight a liquid crystal display on the mobile communication device and to light a keyboard on the device. The LEDs can, for example, be lit when a communication is received, for example, a mobile telephone call. The LEDs can also be lit when a key or keys are depressed.

One or more LED's can be used depending on the requirements of a particular embodiment. Moreover, light pipes can be used in conjunction with the LEDs. A light pipe is a type of wave guide that can be used to guide the light being emitted from one or more LEDs from the light emitting surface of the LED to the point were the light is to be delivered. A light pipe can also be used to evenly defuse the light being delivered over a broad area, or to focus the light on a specific point. For example, where it once took several LEDs arrayed along the sides of a mobile communication device display to provide sufficient backlighting behind the entire display, a single LED can now often be used when combined with a light pipe that is flat and roughly the same dimension as the display. The light pipe has a narrow opening at the surface of the LED and then becomes broad and flat. The broad flat section fits behind the display and diffuses the light being emitted from the LED throughout the entire flat section, thus backlighting the entire display.

Light pipes can come in many shapes and dimensions, for example a light pipe can be used to form a border around a mobile communication device display. Thus, for example, one LED and one light pipe can be used to backlight a mobile communication device display, while another light pipe can be used as a border for the display. A second LED, e.g., of a different color can then be used in conjunction with this second light pipe to light up the border around the display.

Light pipes provide flexibility to the designer of a mobile communication device in that LEDs or other light sources can be placed where convenient and the light can be "piped" to the delivery point. In other words, the LED or light source placement is not constrained by any need to place it next to the point of delivery. The ability to conveniently place the LED or light source can allow more efficient placement of the LED or light source.

SUMMARY OF THE INVENTION

A mobile communication device can include an alerting mechanism that comprises a light source that produces light responsive to an event. A light pipe can be coupled to the light source to bring the light from the location of the light source to another location. Alternatively, a light source can be mounted on a display module. A processor can be coupled to the light source and configured to cause the light source to produce light responsive to an event. Events can include receiving a mobile communication, such as a telephone call, voice mail message, etc.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

The systems and methods described herein are directed to mobile communication devices that incorporate an alerting mechanism that can be configured to signal the user when certain events occur. For example, the alerting mechanism can be configured to alert the user when an incoming communication is being received. Alternatively, or in addition, the alerting mechanism can be configured, e.g., to alert the user in relation to an alarm associated with a program, such as a calendar program, running on the device. Conventional alerts include rings, songs, or a vibrate mode; however, unlike conventional alerts, the alerting mechanisms described herein can also comprise visual alerts that can be standalone or synchronized with an audible alert such as one of the conventional alerts just mentioned.

The visual alerting mechanisms described herein can, e.g., use a light source, such as an LED, or multiple LEDs, configured, e.g., to flash or blink in a particular manner whenever the alerting mechanism is triggered. Adding LEDs and control lines to control the LEDs can, in certain instances, tax the already precious resources within a mobile communication device. Accordingly, in certain embodiments described below, resources such as space and control lines are used, or reused, in a manner designed to conserve such resources.

Figure 1:
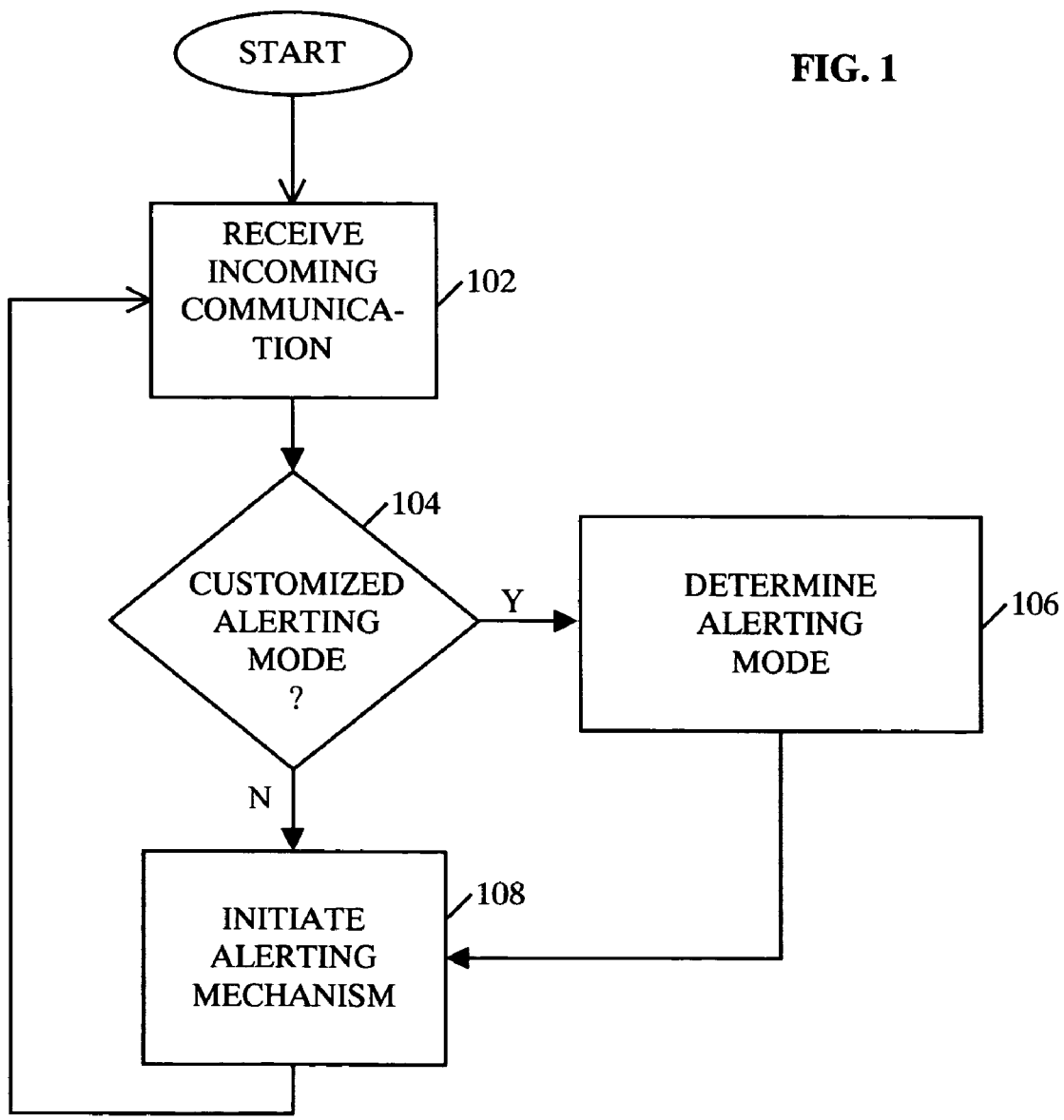
FIG. 1 is a flow chart illustrating an example process for initiating a alerting mechanism in accordance with on embodiment.

Thus, in the systems and method described herein, a light source is included in the mobile communication device that can be configured to light up, flash, blink, etc., to indicate that a certain event, such as an incoming communication or an alarm, is occurring, or has occurred. FIG. 1 is a flow chart illustrating an example process for trigger such an alerting mechanism in accordance with the systems and method described herein. For purpose of the example illustrated by the flow chart of FIG. 1, the event is an incoming communication; however, this should not be seen as limiting the embodiments described herein to incoming communications or any particular event.

In step 102, the incoming communication is received. In certain embodiments, the alerting mechanism can be customized. For example, the mode of operation of the light source in response to the event can be selectable, depending on the embodiment. In other words, the light source can, e.g., be configured such that it can blink, flash, just light up, or some combination thereof, as selected by the user. Moreover, several different light sources with several different colors can be used such that alternating colors or color patterns can be selected. In other embodiments, the mode of operation of the light source can be fixed or pre-defined, e.g., in the factory. Thus, it can be determined in step 104, whether a customized mode of operation has been selected. If so, then the mode can be determined step 106 and initiated in step 108. As examples, the light source can be configured such that it flashes in synchronization with the rings of the ring tone. Moreover, the light source can be configured to light, flash, blink etc., in synchronization with, e.g., a song, tune, or jingle, selected to replace the ring tone.

In certain embodiments, a lens is include in the housing of the mobile communication device through which the light from the light source can be output. The lens can be colored, depending on the embodiment, such that it matches the color of the housing. Three example embodiment for including a lighting source as part of an alerting mechanism, in accordance with the systems and methods described herein, are described below. These embodiments should not be seen as limiting the invention to certain configurations however.

In one example embodiment, the light source can be included on a separate circuit board within the housing of the mobile communication device. In such embodiments, the separate board can then be placed near the point where the light from the light source is to be delivered. For example, in embodiments that include a lens in the housing, such as described above, the separate board should be placed in a location within the housing such that the light emitted from the light source will be output through the lens. Alternatively, a light pipe can be used to "pipe" (i.e., transmit) the light from the light source on the separate board to the point where the light needs to be delivered. The use of a light pipe is described in more detail below. The separate board can be dedicated to the light source or can comprise other circuits and functions depending on the embodiment.

In a second embodiment, the light source can be included on the "main board" within the housing. Mobile communication devices typically have one or more main boards that include the processing and other circuitry. Thus, "main board" as used herein is intended to refer to one of these types of boards as opposed to a separate board included for some dedicated purpose, such as for a display module as described below. When the light source is included on the main board, then a light pipe can be used to "pipe" the light from the light source to the point of delivery, e.g., the lens in the housing. It can be preferable to incorporate the light source onto the main board, since including a separate board with in the housing can take up space and increase costs. As mobile communication devices grow ever smaller and slimmer, the space requirement for including a separate board can have a negative impact on the overall design of the device.

Figure 2:
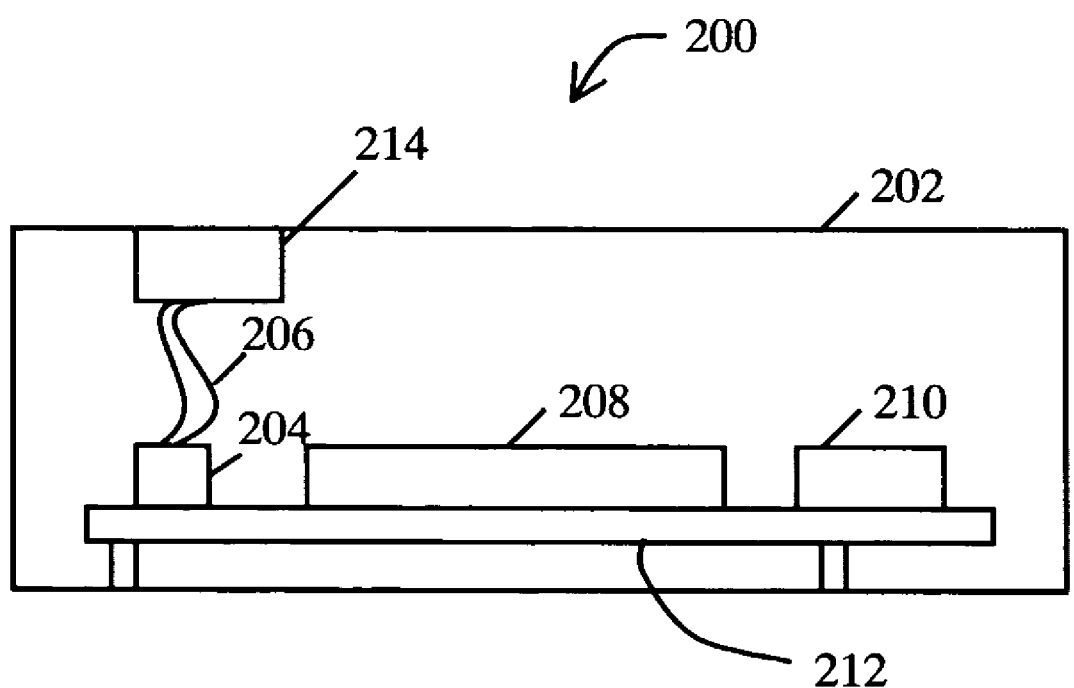
FIG. 2 is a diagram illustrating an example wireless communication device configured to include an alerting mechanism in accordance with one embodiment.

FIG. 2 is a diagram illustrating an example embodiment of mobile communication device 200 that includes an alerting mechanism as described above, wherein the light source, or sources, is mounted on the main board. Mobile communication device 200 can be enclosed in case 202. The case can, for example, be made of plastic, metal, or some other material, or combination of materials. Case 202 can include an opening into which, or over which, lens 214 can be mounted. Lens 214 can, as explained above, be colored to match the color of the surrounding area of case 202. As shown in FIG. 2, case 202 can enclose multiple components of the mobile communication device.

It should also be noted that the example of FIG. 2 is not intended to limit the embodiment to devices that comprise a single case. Rather, the systems and methods described herein are equally applicable to multi-case embodiments. For example, a mobile communication device, such as a mobile telephone handset can be a "clam shell" design. In such a design, two cases are connected together with a hinge in between them. Some components that make up the mobile telephone handset are in one case, and some are in the other. "Clam shell" design mobile telephone handsets are fairly common and, for brevity, will not be discussed further herein. Moreover, there are many other types of single and multi-case designs, and it will be appreciated that the systems and methods described herein can be applied to any such designs with the requisite adjustment necessitated by the particular case.

Light source 204 can, for example, be a light emitting diode. In another embodiment, light source 204 can be a light bulb, or other device that emits light. Additionally, as described above, multiple types of light sources 204, can be used in a single mobile communication device 200. Light from light source(s) 204 can be brought to surface of case 202 by using light pipe 206. Light pipe 206 can, for example, be an optical fiber. Light pipe 206 can allow light source 204 to be placed in mobile communication device 200 in areas that are not proximate to a surface of case 202, or lens 214.

Light source 204 can be controlled by processor 208. In one embodiment, processor 208 can turn light source 204 on and off responsive to an event such as receiving a mobile communication. Processor 208 can turn light source 204 on and off in a predetermined pattern. For example, the predetermined pattern could match notes in a ring tone selected. Additionally, different patterns can be selected to indicated the identity of a person making an incoming mobile communication. Alternatively, a different pattern can indicate different types of mobile communication. For example, one pattern can be used for an incoming mobile telephone call while another pattern can indicate that a voice mail message has been received by a wireless telephone service.

Processor 208 can be a microprocessor, a digital signal processor, digital logic, or some combination of microprocessors, digital signal processors, and digital logic. Processor 208 can be a mobile system modem (MSM). Additionally, processor 280 can be coupled to memory 210. Memory 210 can store information that can be read and written by processor 208. The information can include instructions read and executed by processor 208. Additionally, the information can be data written by processor 208. In one embodiment, light source 204, processor 208, and memory 210 can be placed on printed circuit board 212, i.e., the "main board". Other components, not shown, can also be placed on printed circuit board 212.

By using light pipe 206, light from light source 204 can be delivered to an appropriate point, e.g., lens 214, without the need to place light source 204 directly proximate to lens 214, e.g., using a separate board as described above. In this manner, space within device 200 can be conserved, and device 200 can be made slimmer and/or smaller.

In a third embodiment, the light source, comprising part of the alerting mechanism can be included on a display module, or display board, within the housing. Mobile communication devices, e.g., handsets, often include a separate display module, or board, that sits above the main board within the housing and is connected thereto. Such display modules often include light sources, such as LCDs. Accordingly, it is possible to add light sources, such as LEDs, to the display module with little or no impact on the complexity or cost of the overall design.

Figure 3:
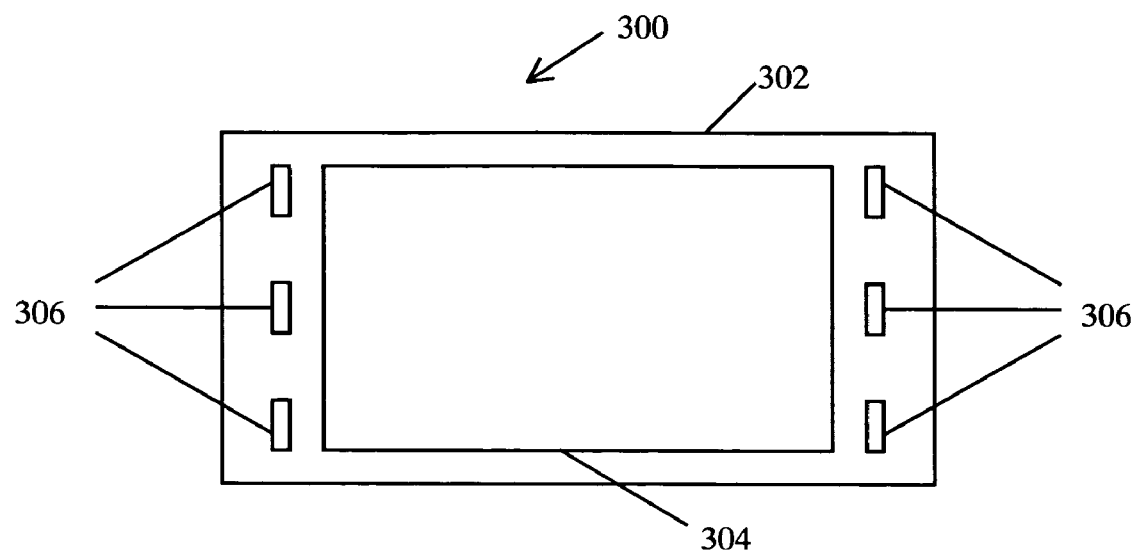
FIG. 3 is a diagram illustrating an example display configured to include a light source that comprise part of an alerting mechanism in accordance with one embodiment.

FIG. 3 is a diagram illustrating example display module 300 that can include a light source comprising part of an alerting mechanism as described herein. Display module 300 can include a base, e.g., circuit board, 302. Liquid crystal display (LCD) 304 is attached to base 302. LCD 304 can be used as a display for a mobile communication device, such as a mobile telephone handset. Additionally, one or more light sources 306 can be attached to base 304. Light sources 306 can be LEDs or other light emitting devices.

Again, engineering resources, such as space and cost, used to design mobile communication devices, such as mobile telephone handsets, is limited. By using display module 300, for example, a single base device design can be transformed into a variety of different mobile communication device models. In this manner, a single generic design can be used to make a plurality of different devices with different features. For example, if a device design is to include an alerting mechanism as described herein, then display module 300 that includes the requisite light source, or sources, 306 can be included. If the device is not to include the alerting mechanism as described herein, then display module 300 that does not include the extra light source, or sources, 306 can be included in the device.

Light source 306 can be a plurality of light sources. For example, a plurality of LEDs can be used. Further, a plurality of different types of light sources, such as LEDs and/or light bulbs can also be used. Light sources 306 can be added to, or removed from, existing designs by adding and removing light sources 306 to display module 300 as required. Thus, the limited amount of space within the case and on the main board can be conserved. In other words, incorporating light sources 306 onto display module 300 conserves space within a mobile communication device that can be used for other features, circuits, etc.

Light source 306 can be controlled by a processor. The processor used to control light source 306 can be the same processor used to control LCD 304. Moreover, in certain embodiments, the processor can be configured to control light source 306 without additional control signals by multiplexing the signals used to control light source 306 with those used to control LCD display 304. In this way a display module 300 without light source 306 can be changed to display module 300 with light source 306 while minimizing changes to the base design of the mobile communication device, or other electronic device using display module 300.

Figure 4:
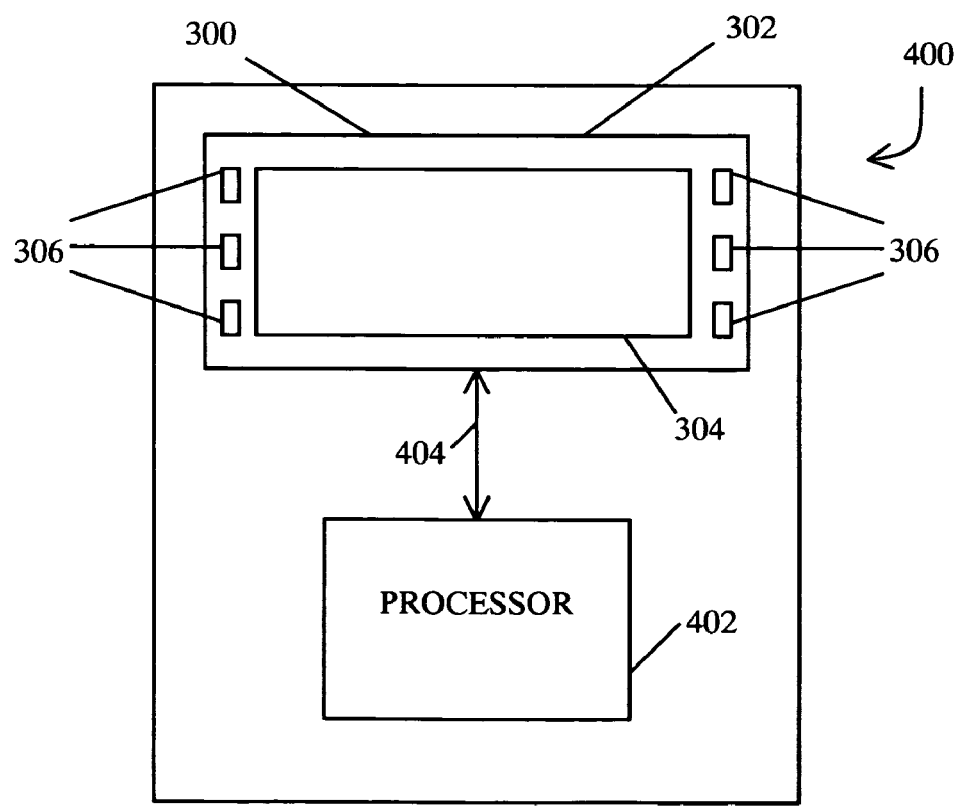
FIG. 4 is a diagram illustrating an example wireless communication device configured to include an alerting mechanism in accordance with another embodiment.

FIG. 4 is a diagram illustrating example mobile communication device 400 incorporating display module 300. Mobile communication device 400 can be, e.g., mobile communication device, such as a mobile telephone handset. Additionally, mobile communication device 400 can be any other electronic device that can use a display module. Display module 300 can be controlled by processor 402. Processor 402 can be, for example, a microprocessor, a digital signal processor, digital logic, or some combination of microprocessors, digital signal processors, digital logic, or a mobile system modem (MSM).

In one embodiment electrical connections 404 between processor 402 and display module 300 can be multiplexed, such that one connection can serve multiple purposes. By multiplexing the connections each connection can be used for one or more signals. For example, in one embodiment, signals that are used to control LCD display 304 can also be used to control light source 306. In this way a display module 300 can, in some cases, use the same number of connections between processor 402 and display module 300 that includes light sources 306 as would be used by a display module that does not include light source 306. As described above, in this way the number of changes between a display module that does not include light source 306 and display module 300 that does include a light source 306 can be minimized. While a single line is shown for connections 404, the single line can represent multiple signal connections. Additionally, while the single line is shown as a bidirectional connection, in some embodiments, and for some signals, the connections may not be bidirectional.

Again, by multiplexing the signals, resources within device 400, such as space on the main board, can be conserved because additional traces are not required to control light source(s) 306. Further, by incorporating light source(s) 306 on display module 300, space within device 400 is also conserved.

Processor 402 can be configured to turn one or more light sources 306 on and off responsive to an event such as receiving a mobile communication. In one embodiment, processor 402 can be configured to turn light source 306 on and off in a predetermined pattern. For example, the predetermined pattern can be configured to coincide with notes in a ring tone. In other embodiments, different patterns can be selected to indicated the identity of a person associated with the incoming mobile communication. Alternatively, a different pattern can indicate different types of mobile communications, for example, one pattern can be used for an incoming mobile telephone call while another pattern can indicate that a voice mail message has been received by a wireless telephone service.

In one embodiment each light source 306 can be connected to an output pin on processor 402. Other embodiments are, however, possible. For example, circuitry, such as digital logic, can be placed between processor 402 and a plurality of light sources 306. In this way, a limited number of output pins on processor 402 can be used to control multiple light sources 306. In one embodiment, a register (not shown), a type of digital logic device, can be placed between processor 402 and light sources 306. Processor 402 can then be configured to write to the register and control multiple light sources 306.

Thus, by implementing the systems and methods described herein, an alerting mechanism that provides a pleasing visual alert can be added to a mobile communication device. The alert can be synchronized with other alerting mechanisms such as audible alerting mechanisms. Moreover, the components, circuitry, control lines, and control algorithms required to implement an alerting mechanism as described herein can be added to a device in a manner that only minimally adds to, or burdens, the resources within the device.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A mobile communication device, comprising:
    an audible alert mechanism configured to issue an audible alert in response to an event, wherein the event comprises receiving an incoming communication;
    a main board within a housing;
    a main board processor disposed on the main board;
    a first light source disposed on the main board;

a second light source disposed on the main board;
a display module that sits above the main board;
a display module processor disposed on the display module;
a liquid crystal display (LCD) disposed on the display module;
a light emitting diode (LED) disposed on the display module;
a first light pipe operatively coupled to the first light source on the main board, wherein the first light pipe is configured to convey light from the first light source to a first point of delivery;
a second light pipe operatively coupled to the second light source on the main board, wherein the second light pipe is configured to convey light from the second light source to a second point of delivery;
a first lens associated with the main board that conveys light originated by the first light source, wherein the first lens is operatively coupled to the first light pipe at the point of delivery and the first lens is configured to convey light from the first light pipe;
a second lens associated with the main board that conveys light originated by the second light source, wherein the second lens is operatively coupled to the second light pipe at the point of delivery and the second lens is configured to convey light from the second light pipe;
an electrical connection between the display processor and the display module, wherein the electrical connection is multiplexed so that signals used to control the LCD can also be used to control the LED; and
a register placed between the main board processor and the light sources on the main board, wherein the processor is configured to write to the register and control the light sources of the main processor, the main board processor configured to control the light sources so as to produce light responsive to the event in a synchronous manner with the audible alert issued from the audible alert mechanism.

2. The mobile communication device of claim 1, wherein the incoming communication comprises a mobile telephone call.

3. The mobile communication device of claim 1, wherein the light source for the main board comprises a light emitting diode.

4. The mobile communication device of claim 1, wherein the light source for the main board comprises a plurality of light emitting diodes.

5. The mobile communication device of claim 1 wherein the main board processor is configured to control the light source so as to produce light responsive to an event via a signal sent through one of the electrical connections to control at least one other function related to the display module using the electrical connection.

6. The mobile communication device of claim 1, wherein the lens is colored to match the color of the housing.

7. The mobile communication device of claim 1 wherein the light pipe is configured to deliver light from the first light source location corresponding to a printed circuit board to the point of delivery that is adjacent the housing.

* * * * *